Oct. 5, 1926.  1,602,066
C. L. BURTON
MOTOR VEHICLE
Filed August 24, 1925
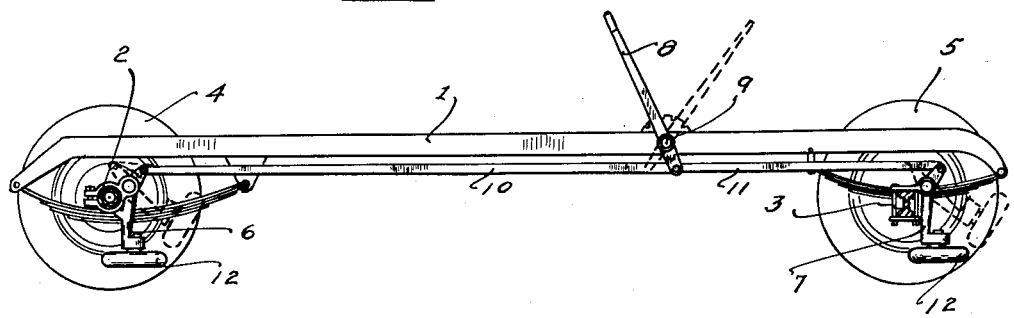
Fig. 1
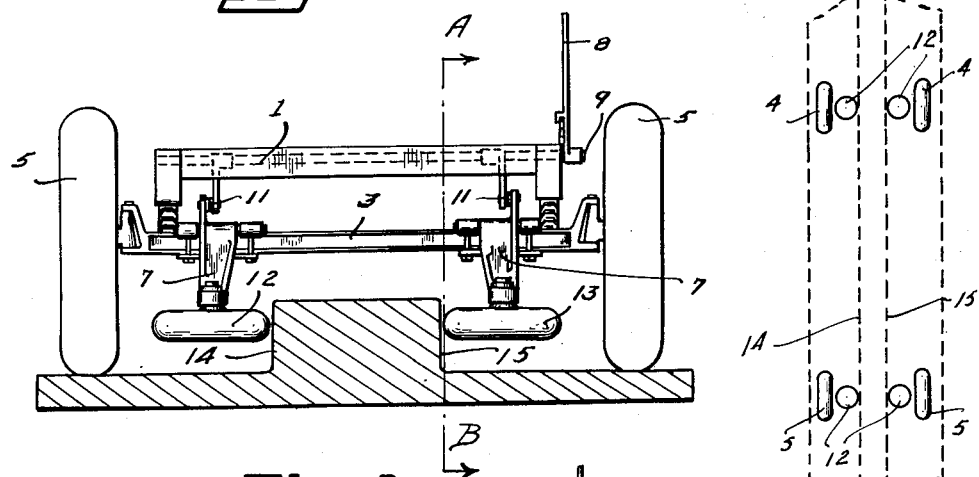
Fig. 2
Fig. 4
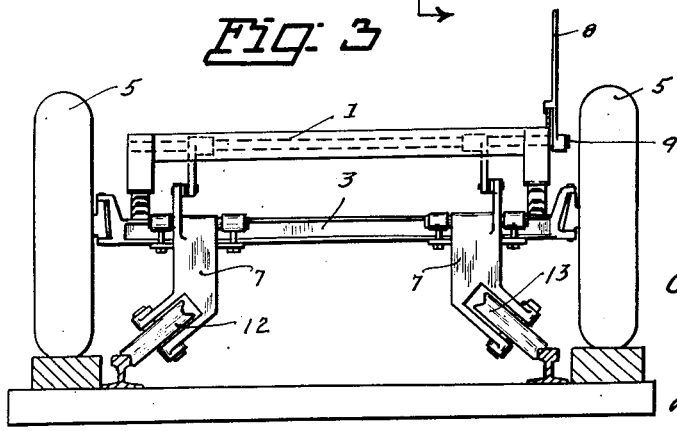
Fig. 3
Inventor
Charles L. Burton
By his
Attorney
Thomas Bilyeu Patented Oct. 5, 1926.

1,602,066

UNITED STATES PATENT OFFICE.

CHARLES LOUIS BURTON, OF PORTLAND, OREGON.

MOTOR VEHICLE.

Application filed August 24, 1925. Serial No. 52,122.

This patent application relates to my pending application as evidenced by Serial Number 52,121, filed in the United States Patent Office, August 24, 1925, upon a fabricated motor roadway.

My invention relates to a new and improved motor vehicle for use in commercial work where an economical carrier is required and wherein fairly high speeds are required.

A further object of my invention is to provide a new and improved motor vehicle of simple wheel construction and wherein the steering of the same may be accomplished by the contacting of guide wheels with guide ways disposed upon the motor roadway and wherein the steering is accomplished by the contacting of these wheels with the guideway, and wherein the operating engineer has no part in the guiding of the vehicle along the main roadway.

With these and incidental objects in view, the invention consists in certain novel features of construction and combination of parts, the essential elements of which are set forth in the appended claims and to a preferred form of embodiment of which is hereinafter shown with reference to the drawings which accompany and form a part of this specification.

In the drawings:—

Fig. 1 is a side view of the motor chassis with one each of the rear and front wheels shown removed to better illustrate the means for raising and lowering the guide wheels.

Fig. 2 is an end view of the assembled device, the same being shown in position upon my new and improved fabricated motor roadway, patent application upon which is filed concurrently with this application.

Fig. 3 is also an end view of one preferred form of my new and improved device, the same being shown for use wherein the guideways are in the form of rails.

Fig. 4 is a diagrammatical view of my new and improved device, in place upon a motor roadway, adapted to have the same operated upon.

Like reference characters refer to like parts throughout the several views.

1 is the chassis of a motor vehicle, having a rear axle 2, and a front axle 3, for supporting the same upon rear wheels 4, and front wheels 5. For the purpose of simplification, I have shown my device upon a chassis only and have not shown any supporting body or frame structure, as the same is adapted for use in any form wherein a self-propelled motor vehicle is used for the transporting of commercial commodities, both freight and passenger, and the character of supporting body will depend upon the class of service in which the same is to be operated. Mounted upon the axle structure are rotatable brackets 6, upon the rear axle, and 7 about the front axle structure. These brackets may be rotated about a fixed cross journaled member, or about the axle itself. I do not wish to be limited to the exact method of rotating the same or partially rotating the same, as it may be accomplished in any manner to bring about the desired result. An actuating lever 8, adapted to power or hand manipulation and journaled about a fixed center 9, the lower end of the manipulative lever being connected to the manipulative rods 10 and 11. The lever, as shown in full line position in Fig. 8, is arranged for the guide wheels 12 and 13, for contacting with the guideways 14 and 15, upon the roadway for guiding the motor vehicle in a fixed path of travel and when the lever is thrown into the dotted position, as shown in Fig. 1, the guide wheels are brought out of engagement with the guideway, as shown in the dotted position in Fig. 1.

In a motor vehicle of this type, it may be found desirable in long stretches of roadway, where a maximum of speed is to be maintained to operate the same over a roadway adapted to rapid transit, wherein the guide wheels will contact with the guiding surfaces of the roadway and when turn out points are reached, or it is desired to leave the roadway for partial or full loads, deliveries to be made off of the main line, to disengage these wheels from the guideways and at the same time to elevate the same to pass over obstructions that may be met, in roadbeds as ordinarily maintained.

It may be found desirable to use motor vehicles of this type, and in modified form, for use on railway roadbeds, wherein supporting treads for the motor vehicle may be laid parallel to the tracks of the railway and wherein guide wheels of a type illustrated in Fig. 3, are made to contact with the rails of the railway. It also being found desirable and expedient to raise these guide wheels into and out of engagement with the rails.

I do not wish therefore to be limtied to any particular type of construction or application of my device, as I may wish to use the same in modified forms not herein shown.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. A new and improved motor vehicle, comprising a motor vehicle chassis, mounted upon supporting wheels, brackets pivotally connected at one end to the axles of said chassis, means to pivotally manipulate said brackets, comprising a pivotally mounted lever, and a series of manipulative rods disposed between said lever and said brackets; and guide wheels rotatably mounted on said brackets at the end opposite the pivoted end, and adapted to contact with, and travel along a vertical central guideway.

2. A new and improved motor vehicle, the combination of a vehicle propelled by mechanical means, and having a front and rear axle, of brackets pivotally mounted upon said axles and adapted to be rocked parallely to the longitudinal lines of the vehicle; means to rock said brackets on their pivotal bearings consisting of a lever and a plurality of manipulative rods disposed between the lever and said brackets; guide wheels rotatably mounted at the outer extremities of said brackets and at right angles to the wheels of the vehicle, and adapted to engage and travel upon a raised vertical guideway disposed central of a roadway.

CHARLES LOUIS BURTON.